United States Patent
Melakari et al.

(10) Patent No.: US 11,733,547 B1
(45) Date of Patent: Aug. 22, 2023

(54) MODULATING IMPEDANCE TO SEGMENTS OF GROUND PLANE

(71) Applicant: Pixieray Oy, Espoo (FI)

(72) Inventors: Klaus Melakari, Espoo (FI); Ari Pitkänen, Vantaa (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 17/953,917

(22) Filed: Sep. 27, 2022

(51) Int. Cl.
  *G02C 7/08* (2006.01)
(52) U.S. Cl.
  CPC ......... *G02C 7/083* (2013.01); *G02C 2202/20* (2013.01)
(58) Field of Classification Search
  None
  See application file for complete search history.

(56) References Cited

U.S. PATENT DOCUMENTS

| | | | | |
|---|---|---|---|---|
| 4,001,809 | A * | 1/1977 | Fukui | H03K 21/18 345/107 |
| 9,800,273 | B1 * | 10/2017 | Abdelhalem | H03F 3/3022 |
| 11,442,332 | B1 * | 9/2022 | Sprague | G02C 7/083 |
| 2001/0040743 | A1 * | 11/2001 | Graves | G02F 1/29 359/849 |
| 2013/0342887 | A1 * | 12/2013 | Leister | G03H 1/0248 359/254 |
| 2014/0139768 | A1 * | 5/2014 | Galstian | G02F 1/134309 349/33 |
| 2015/0002804 | A1 * | 1/2015 | Khan | G02F 1/133553 349/202 |
| 2015/0029424 | A1 * | 1/2015 | Gordon | G02C 7/083 349/13 |
| 2016/0178811 | A1 * | 6/2016 | Choi | G02B 3/14 349/200 |
| 2018/0052377 | A1 * | 2/2018 | Gordon | G02F 1/13439 |
| 2018/0246354 | A1 * | 8/2018 | Popovich | G02F 1/133526 |
| 2020/0301239 | A1 * | 9/2020 | Akkaya | G02B 27/0172 |
| 2021/0318589 | A1 * | 10/2021 | Van Heugten | G02C 7/083 |
| 2022/0029268 | A1 * | 1/2022 | Facco | H01P 5/16 |

* cited by examiner

*Primary Examiner* — Ryan Crockett
(74) *Attorney, Agent, or Firm* — Ziegler IP Law Group

(57) ABSTRACT

An active optical element includes an active material encased between a first substrate and a second substrate, first electrode(s), second electrodes employed as a ground plane, and means for applying and modulating additional impedance between an electrical ground and the second electrodes. The second electrodes divide the active optical element into segments. The first electrode(s) are driven at given voltage(s). At least one of the second electrodes corresponding to at least one of the segments is selectively connected to an electrical ground without any additional impedance, while applying and modulating the additional impedance between the electrical ground and a remainder of the plurality of second electrodes. The active material in the at least one of the plurality of segments is controlled by a potential difference generated between the given voltage(s) and the electrical ground to produce a given optical power.

21 Claims, 8 Drawing Sheets

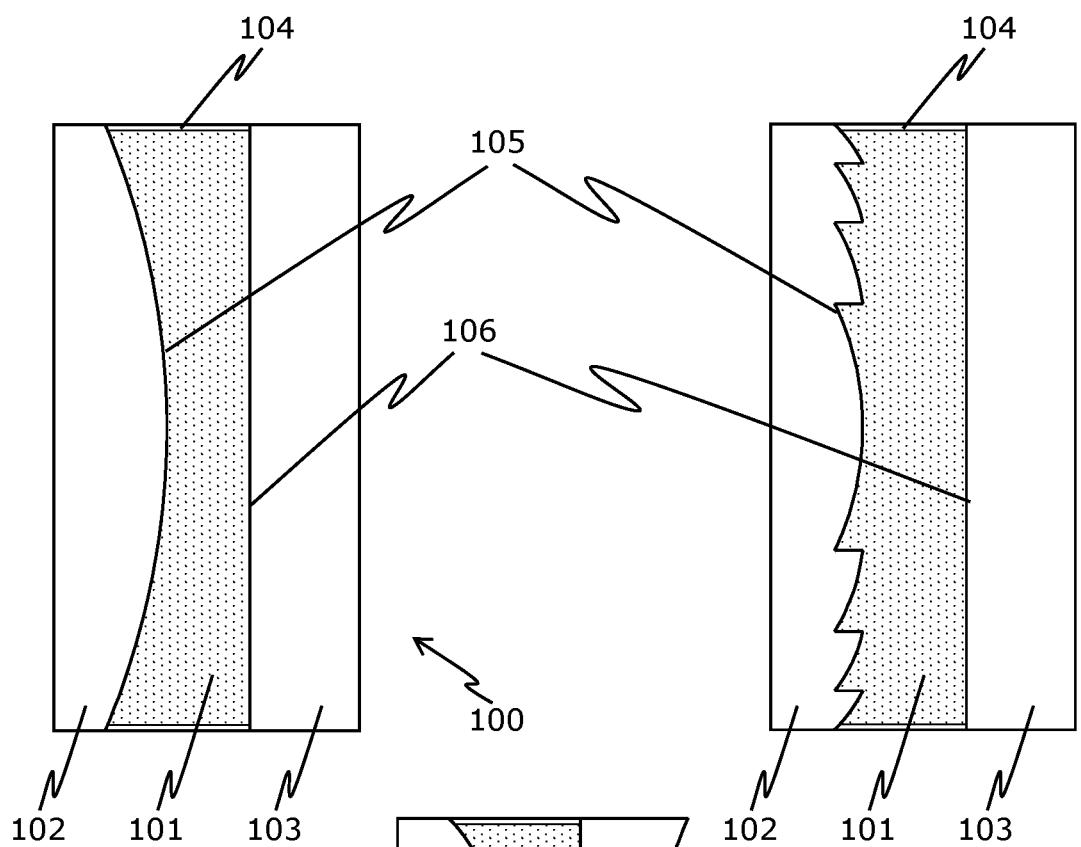
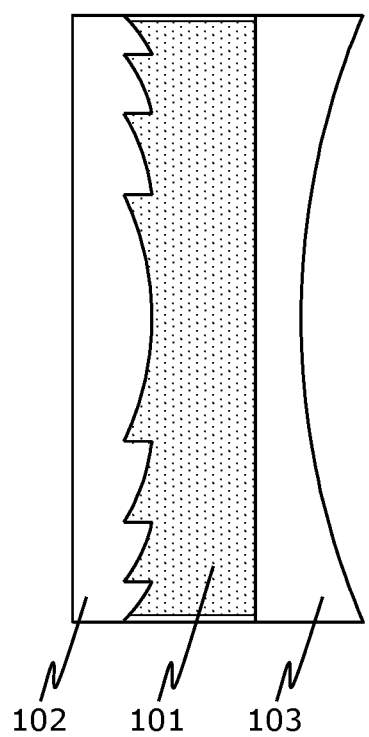
FIG. 1A
FIG. 1B
FIG. 1C

MODULATING IMPEDANCE TO SEGMENTS OF GROUND PLANE

TECHNICAL FIELD

The present disclosure relates to active optical elements. Moreover, the present disclosure relates to optical apparatuses.

BACKGROUND

Liquid crystal lenses are often employed in active optical elements and optical apparatuses. Driving a liquid crystal lens requires alternating current (AC) signal. This AC signal is referenced to a ground plane that is connected to an electrical ground. Power requirements of the liquid crystal lens increase with its size.

Large-sized liquid crystal lenses have also been used to generate an optical power in only specific areas that are being actively used. As an example, in a pair of adaptive eyeglasses, this specific area would be an area through which a user is looking.

However, conventional usage of liquid crystal lenses in active optical elements and optical apparatuses suffers from certain disadvantages. Firstly, an entirety of a ground plane of a liquid crystal lens is connected to an electrical ground, whilst different voltages are applied to driving electrodes of the liquid crystal lens, so as to produce an optical power in a specific area of the liquid crystal lens. As a result, capacitance is formed in an entirety of the liquid crystal lens, thereby wasting electrical power. This can be critical for optical apparatuses that are battery operated, and therefore, have only a limited supply of electrical power.

Secondly, in order to selectively tune the optical power of a particular area of the liquid crystal lens or to differently tune the optical power of different areas of the liquid crystal lens at the same time, an amplitude of the driving voltages applied to the driving electrodes are required to be modulated. Amplitude modulation is, however, only possible within areas that have dedicated driving electrodes and driving signals. Implementing a large number of driving electrodes and driving signals complicates the liquid crystal lens, both in its electrode structure (of the driving electrodes) as well as in its driving circuit for driving these electrodes.

Therefore, in light of the foregoing discussion, there exists a need to overcome the aforementioned challenges associated with conventional active optical elements and optical apparatuses.

SUMMARY

The present disclosure seeks to provide an improved active optical element. Moreover, the present disclosure seeks to provide an improved optical apparatus. Furthermore, the present disclosure also seeks to provide a solution to the existing problems of conventional active optical elements and optical apparatuses.

In a first aspect, an embodiment of the present disclosure provides an active optical element comprising:
- at least a first substrate and a second substrate, the first substrate and the second substrate being optically transparent;
- an active material encased between the first substrate and the second substrate;
- at least one first electrode deposited on the first substrate and disposed between the first substrate and the active material, the at least one first electrode being optically transparent;
- a plurality of second electrodes deposited on the second substrate and disposed between the second substrate and the active material, the plurality of second electrodes being optically transparent, wherein the plurality of second electrodes are to be employed as a ground plane of the active optical element, the plurality of second electrodes dividing the active optical element into a plurality of segments; and
- means for applying and modulating an additional impedance between an electrical ground and the plurality of second electrodes, wherein the plurality of second electrodes are connected to the electrical ground via said means, wherein:
  - an entirety of the at least one first electrode is driven at: at least one given voltage that corresponds to a given optical power to be produced in at least one of the plurality of segments of the active optical element,
  - said means is driven to selectively connect at least one of the plurality of second electrodes corresponding to the at least one of the plurality of segments in which the given optical power is to be produced to the electrical ground without any additional impedance, whilst applying and modulating the additional impedance between the electrical ground and a remainder of the plurality of second electrodes,
  - the active material in the at least one of the plurality of segments is controlled by a potential difference generated between the at least one given voltage and the electrical ground to produce the given optical power thereat.

In a second aspect, an embodiment of the present disclosure provides an optical apparatus comprising an active optical element of the aforementioned first aspect.

Embodiments of the present disclosure substantially eliminate, or at least partially address the aforementioned problems in the prior art, and allow for tuning the given optical power to be produced at a location where it is needed, without a need to tune an amplitude of the given voltage at which the at least one first electrode is driven, whilst reducing power requirements significantly.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 1A-1C are cross-sectional views of an optical apparatus, in accordance with various embodiments of the present disclosure;

Figure 2A:
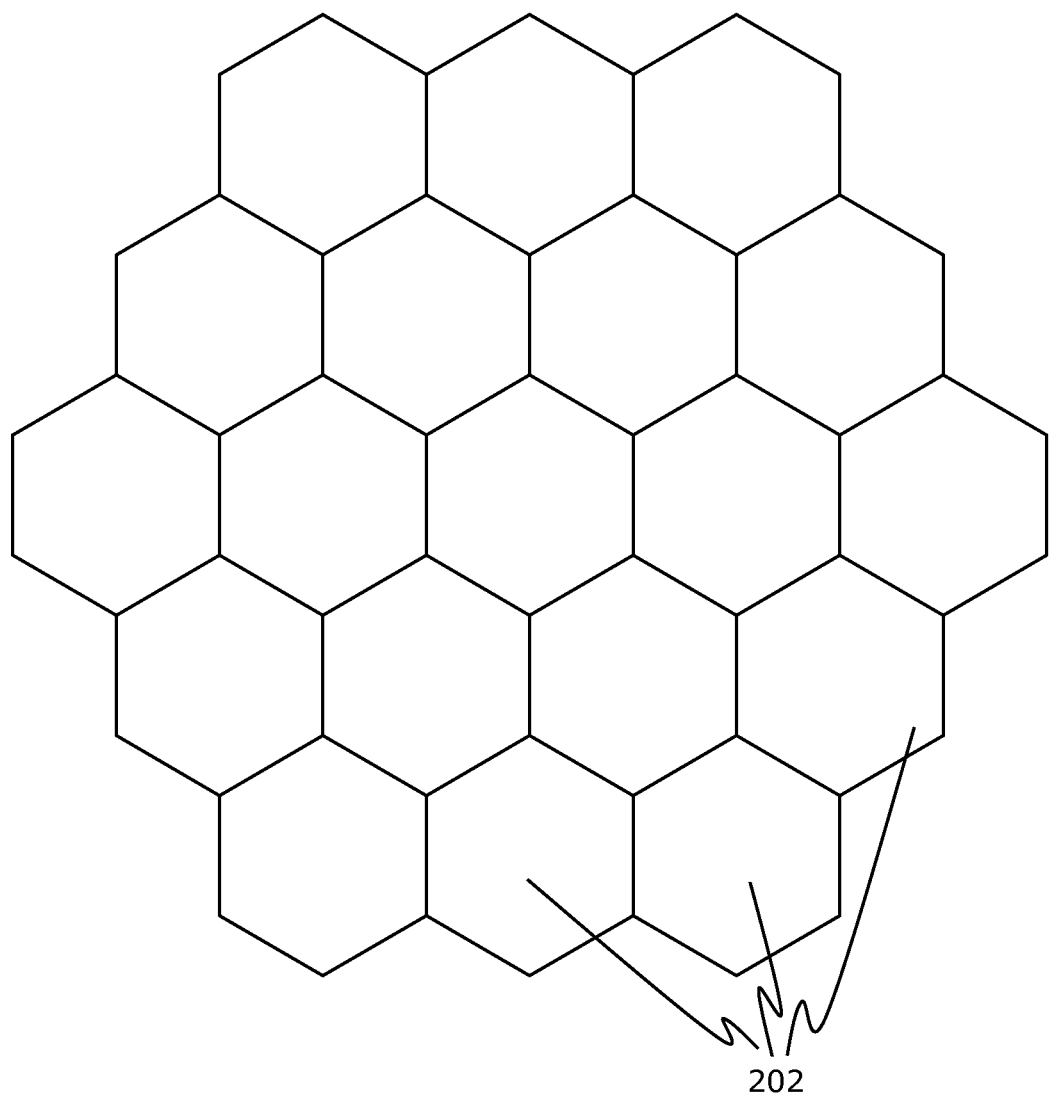
FIG. 2A depicts an example implementation of a plurality of segments of an active optical element, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an active optical element comprising:
- at least a first substrate and a second substrate, the first substrate and the second substrate being optically transparent;
- an active material encased between the first substrate and the second substrate;
- at least one first electrode deposited on the first substrate and disposed between the first substrate and the active material, the at least one first electrode being optically transparent;
- a plurality of second electrodes deposited on the second substrate and disposed between the second substrate and the active material, the plurality of second electrodes being optically transparent, wherein the plurality of second electrodes are to be employed as a ground plane of the active optical element, the plurality of second electrodes dividing the active optical element into a plurality of segments; and
- means for applying and modulating an additional impedance between an electrical ground and the plurality of second electrodes, wherein the plurality of second electrodes are connected to the electrical ground via said means, wherein:
  - an entirety of the at least one first electrode is driven at: at least one given voltage that corresponds to a given optical power to be produced in at least one of the plurality of segments of the active optical element,
  - said means is driven to selectively connect at least one of the plurality of second electrodes corresponding to the at least one of the plurality of segments in which the given optical power is to be produced to the electrical ground without any additional impedance, whilst applying and modulating the additional impedance between the electrical ground and a remainder of the plurality of second electrodes,
  - the active material in the at least one of the plurality of segments is controlled by a potential difference generated between the at least one given voltage and the electrical ground to produce the given optical power thereat.

In a second aspect, an embodiment of the present disclosure provides an optical apparatus comprising an active optical element of the aforementioned first aspect.

Pursuant to embodiments, the plurality of second electrodes correspond to respective ones of the plurality of segments of the active optical element. Selectively connecting the at least one of the plurality of second electrodes (corresponding to the at least one of the plurality of segments) to the electrical ground without any additional impedance, whilst driving the entirety of the at least one first electrode at the at least one given voltage, allows for tuning the optical power produced at the at least one of the plurality of segments of the active optical element. By "connecting to the electrical ground without any additional impedance", it is meant that the at least one of the plurality of second electrodes is connected to the electrical ground, via said means, as though it were connected directly to the electrical ground, resulting in zero voltage thereat. On the other hand, applying and modulating the additional impedance between the electrical ground and the remainder of the plurality of second electrodes creates a "soft" ground at the remainder of the plurality of second electrodes. As a result, the remainder of the plurality of second electrodes are capacitively connected to the at least one first electrode and, therefore, loosely follow the at least one given voltage at which the entirety of the at least one first electrode is being driven depending on an extent of modulation of the additional impedance applied to individual second electrodes in the remainder of the plurality of second electrodes. Thus, in the remainder of the plurality of second electrodes, a very weak electric field is generated (due to phase differences and dielectric losses), and no optical power is produced in a remainder of the plurality of segments. This allows the remainder of the plurality of segments of the active optical element to be left without any optical distortions.

Thus, said means enables the active optical element to produce the given optical power at a location where it is actually needed. As a result, the aforementioned active optical element and the aforementioned optical apparatus are optically efficient, while having low power requirements. This arises from a fact that capacitance between the driving electrodes (namely, the at least one first electrode and the plurality of second electrodes) is formed only where an active optical power is needed. Negligible energy transfer takes place from the at least one first electrode to the electrical ground in the remainder of the plurality of segments; therefore, power consumption of the active optical element and the optical apparatus is reduced greatly.

Moreover, in one implementation, an amount of the additional impedance applied to individual second electrodes in the remainder of the plurality of second electrodes is tuned depending on the extent of modulation of the additional impedance applied. This allows for operating the active optical element to produce spatially-variable optical power, without a need to modulate an amplitude of the given voltage at which the at least one first electrode is driven. This makes an electrode structure as well as a driving circuit of the at least one first electrode simple and easy to manufacture. Moreover, such an implementation also allows for varying the optical power in a gradient manner across neighbouring segments of the active optical element, thereby providing a smooth transition in the optical power between the neighbouring segments. Notably, smooth transition in the optical power is highly desirable for adaptive optical apparatuses that are susceptible to be employed for generating different optical powers in different segments of the active optical element. One example of such adaptive optical apparatuses is adaptive eyeglasses for users having both presbyopia and myopia. Another example of such adaptive optical apparatuses is adaptive eyeglasses for users having presbyopia, who want to transition from reading to looking at far away objects without taking off their adaptive eyeglasses.

In an additional or alternative implementation, the at least one given voltage (at which the entirety of the at least one first electrode is driven) could comprise a plurality of given voltages. In such an implementation, the active material could be a liquid crystal material, wherein the active optical element can be implemented as a liquid crystal Fresnel lens.

Moreover, optionally, the at least one of the plurality of second electrodes (that is selectively connected to the electrical ground without any additional impedance) comprises a first set of second electrodes that are aligned along a cylindrical axis, while the remainder of the plurality of second electrodes comprises:

two second sets of second electrodes adjacent to the first set of second electrodes (one of the two second sets on each side of the first set), and two third sets of second electrodes adjacent to respective ones of the two second sets of second electrodes, wherein the second electrodes in the two second sets and the two third sets are arranged parallel to the cylindrical axis, and wherein an additional impedance applied between the electrical ground and the two third sets of second electrodes is larger than an additional impedance applied between the electrical ground and the two second sets of second electrodes.

This introduces a slight cylindrical aberration in the active optical element, and enables the active optical element to function as a spherocylindrical lens, which is a prescription lens for correcting astigmatism. In this way, the active optical element can be utilised for correcting astigmatism. Moreover, it will be appreciated that the remainder of the plurality of second electrodes can comprise additional sets of second electrodes in a similar manner, wherein the additional impedance applied to an outer set of second electrodes is more than the additional impedance applied to an inner set of second electrodes.

Furthermore, the aforementioned active optical element and the aforementioned optical apparatus can be operated to produce the given optical power at different parts of the active optical element (at different points in time) with a fast response time. Thus, the active optical element and the optical apparatus are susceptible to be employed for various optical purposes. As an example, the active optical element can be employed in adaptive eyeglasses to implement gaze contingency. As another example, the active optical element can be employed in various types of optical apparatuses (for example, such as microscopes, telescopes, projectors, cameras and the like) to selectively provide optical focus at certain portions of these optical apparatuses.

Examples of the optical apparatus include, but are not limited to, a pair of eyeglasses, a pair of sunglasses, a pair of smart glasses, a head-mounted display, a microscope, a telescope, a camera, and a projector. Throughout the present disclosure, the term "active optical element" refers to an optical element whose optical power can be changed.

In some implementations, the given optical power is a positive optical power for use during reading or focussing on nearby objects. This may, for example, be needed when the user has presbyopia. The given optical power may be as prescribed for the user's eye, or may be selected to conform with the user's need.

Pursuant to embodiments, different optical powers can be produced at different parts of the active optical element. As an example, when the user has both presbyopia and myopia, a positive optical power can be produced at a part of the active optical element that is to be used for focussing on nearby objects, while a negative optical power can be produced at a remaining part of the active optical element to facilitate distance viewing. As another example, when the user has presbyopia only, a positive optical power can be produced at a part of the active optical element that is to be used for focussing on nearby objects, while zero optical power can be produced at a remaining part of the active optical element. In these examples, the optical power (whether negative or zero optical power) that is to be produced at the remaining part of the active optical element allows the user to see faraway objects clearly. This optical power is often required to be used more frequently than the positive optical power during a typical day, and is hereinafter referred to as "base optical power" for the sake of convenience only.

Moreover, according to an embodiment, the active optical element further comprises a processor. Optionally, the processor is configured to:

select the at least one given voltage based on the given optical power to be produced in the at least one of the plurality of segments of the active optical element; and generate a drive signal to drive the entirety of the at least one first electrode at the at least one given voltage.

The processor is coupled to said means, and controls the operation of said means. The processor could be implemented as any one of: a microprocessor, a microcontroller, or a controller. As an example, the processor could be implemented as an application-specific integrated circuit (AISC) chip or a reduced instruction set computer (RISC) chip.

Optionally, the processor is configured to generate a drive signal to drive said means to selectively connect the at least one of the plurality of second electrodes to the electrical ground without any additional impedance, whilst applying and modulating the additional impedance between the electrical ground and the remainder of the plurality of second electrodes. The drive signal is generated based on the given optical power that is to be produced and a location of the at least one of the plurality of segments of the active optical element where the given optical power is to be produced.

Optionally, the amount of the additional impedance applied to the individual second electrodes in the remainder of the plurality of second electrodes is varied depending on the extent of modulation of the additional impedance applied. Said means, when driven by the drive signal, controls the extent of modulation of the additional impedance. Optionally, in this regard, the drive signal is generated based on a gradient with which the optical power is to be varied from the given optical power to the base optical power across neighbouring segments of the at least one of the plurality of segments. This allows for operating the active optical element to produce spatially-variable optical power, without a need to tune the amplitude of the given voltage at which the at least one first electrode is driven. This also provides a smooth transition in the optical power between the at least one of the plurality of segments and the neighbouring segments.

Optionally, said means comprises a matrix of thin-film transistor (TFT) switches that are coupled to respective ones of the plurality of second electrodes. Such a matrix of TFT switches allows said means to be integrated into the second substrate, namely, the same substrate on which the plurality of second electrodes are deposited. This makes the design of the active optical element simple, yet durable.

Alternatively, optionally, said means comprises a matrix of metal-oxide-semiconductor field-effect transistor (MOSFET) switches that are coupled to respective ones of the plurality of second electrodes, wherein the MOSFET switches operate as electrically controllable resistors in a triode region.

Yet alternatively, optionally, said means comprises a matrix of programmable resistors that are coupled to respective ones of the plurality of second electrodes. Such programmable resistors are implemented as rheostats. Additionally or alternatively, optionally, said means comprises a matrix of programmable inductors that are coupled to respective ones of the plurality of second electrodes. Yet more additionally or alternatively, optionally, said means comprises a matrix of programmable capacitors that are coupled to respective ones of the plurality of second electrodes. It will be appreciated that such a matrix may comprise any combination of: programmable resistors, programmable inductors, programmable capacitors.

Pursuant to embodiments, said means is beneficially configured to provide a low impedance connection between the at least one of the plurality of second electrodes and the electrical ground, when producing the given optical power at the at least one of the plurality of segments. This enables said means to selectively connect the at least one of the plurality of second electrodes to the electrical ground without any additional impedance. Hereinabove, the term "low impedance connection" refers to an electrical connection having a similar or lower impedance than an impedance of the ground plane. Optionally, an impedance of the low impedance connection lies in a range of 200-500000 ohms (namely, from a few hundred ohms to a few hundred kilo ohms). Beneficially, connecting the ground plane of the active optical element to the electrical ground via the low impedance connection allows the electric field to follow the drive signal quickly and precisely. In other words, when the at least one of the plurality of second electrodes is connected to the electrical ground without any additional impedance, a voltage at the at least one of the plurality of second electrodes remains zero; as a result, a strong electric field is generated between the at least one first electrode and the at least one of the plurality of second electrodes. This maximises an impact of the electric field on the active material in the at least one of the plurality of segments. As an example, in a case where the active material is a liquid crystal material, such a strong electric field generates a strong excitation of liquid crystal molecules in the at least one of the plurality of segments.

Furthermore, in some implementations, the plurality of segments have a polygonal shape, wherein the plurality of segments fit together in a tiled manner. Some examples of the polygonal shape are hexagonal, rectangular, and triangular. In such an implementation, the plurality of second electrodes are deposited as a non-continuous, transparent electrode layer comprising separate, unconnected segments of said electrode layer on the second substrate. Optionally, in this regard, the plurality of second electrodes are implemented as a plurality of isolated tiles of a conductive material. One example of such an implementation has been elucidated in conjunction with FIGS. 2A, 2C, 2D and 2E. Examples of the conductive material include, but are not limited to, indium tin oxide (ITO), doped zinc oxide (ZnO, where ZnO is doped with aluminium or hydrogen), fluorine-doped tin oxide (FTO), indium-doped cadmium oxide (ICO), a conductive polymer, and graphene.

In other implementations, the plurality of segments do not have any defined shape. Optionally, in such an implementation, the plurality of second electrodes are implemented as a single weakly conductive plane with a plurality of highly conductive electrodes. The term "highly conductive electrodes" refers to electrodes whose resistance lies in a range of 1-100 ohms/square; the term "weakly conductive plane" refers to a conductive plane whose resistance lies in a range of 1000-9000000 ohms per square (namely, from 1 kilo ohms/square to 9 mega ohms/square). In such implementations, the plurality of second electrodes could be deposited by forming the single weakly conductive plane by depositing a thin layer of a conductive material on the second substrate, and then connecting the plurality of highly conductive electrodes (acting as feed electrodes) to respective parts of said weakly conductive plane, wherein the highly conductive electrodes are to be selectively connected to the electrical ground, thereby grounding only selective parts of said weakly conductive plane. The highly conductive electrodes could be made of a thick layer of or wires of the conductive material, examples of which include, but are not limited to, ITO, doped ZnO, FTO, ICO, nano silver, and silver inks. The weakly conductive plane could be made as a single continuous layer. Alternatively, the weakly conductive plane could be made in a form of a mesh having cut-outs; this increases a sheet resistance of the weakly conductive plane. As an example, a thickness of the weakly conductive plane made of a thin layer of ITO could lie in a range of 10-500 nm.

In yet other implementations, the plurality of segments comprise a central portion and a plurality of sectors surrounding the central portion, wherein the central portion and the plurality of sectors are arranged around an optical axis of the active optical element. One example of such an implementation has been elucidated in conjunction with FIGS. 4A and 4B. The plurality of sectors could be formed using the conductive material in a similar way as the plurality of isolated tiles, as described above. Optionally, the central portion is shaped as a simple closed curve. Herein, the term "simple closed curve" refers to a connected curve that does not cross itself and ends at the same point where it begins. Hexagons, octagons, circles and ellipses are some examples of simple closed curves. Despite the name "curve", a simple closed curve does not actually have to be curved. Some simple closed curves are made of line segments only, and are known as polygons, while some simple closed curves are made by curved lines only. Other simple closed curves are made of both line segments and curved lines.

Moreover, optionally, the at least one first electrode is deposited as a transparent electrode layer on the first substrate. In such a case, the electrode layer covers an entirety of a surface of the first substrate, such that the electrode layer is disposed between said surface of the first substrate and the active material. Alternatively, optionally, the at least one first electrode comprises a plurality of first electrodes that are deposited as a non-continuous, transparent electrode layer comprising separate, unconnected segments of said electrode layer on the first substrate. In such a case, the plurality of first electrodes are aligned with respective ones of the plurality of second electrodes. Such electrode layers may, for example, be made of ITO, doped ZnO, FTO, or ICO. Alternatively, such electrode layers may be made of a conductive polymer or graphene.

In an implementation, a given segment of the active optical element corresponds to a single second electrode, such that the number of second electrodes (in the plurality of second electrodes) is equal to the number of segments (in the plurality of segments). In another implementation, a given segment corresponds to multiple second electrodes. In both these implementations, the plurality of second electrodes are arranged to divide the active optical element into the plurality of segments. In this regard, the drive signal is generated to selectively address the at least one of the plurality of second electrodes that corresponds to the at least one of the plurality of segments, to produce the given optical power thereat. In other words, the active material in the plurality of segments is to be controlled by corresponding second electrodes. It will be appreciated that the active optical element is divided only virtually into the plurality of segments; the active material in the plurality of segments is not separated by physical boundaries.

Moreover, the optical apparatus comprises a power source to supply electrical power to the aforesaid electrodes and, optionally, to the processor. The power source and, optionally, the processor may be installed at any suitable location on the optical apparatus. As an example, when the optical apparatus is implemented as a pair of glasses, the power source and, optionally, the processor may be installed at a frame of said pair of glasses. The power source and/or the processor can be located at a bridge or an end of a temple of the frame.

Throughout the present disclosure, the term "active material" refers to a material that is controlled to produce a particular optical power at a particular segment of the active optical element. Optionally, the active material is a liquid crystal material. By "controlling the active material" in a particular segment of the active optical element, it is meant that a refractive index of the active material can be controlled in that particular segment of the active optical element.

The given optical power is produced by creating a relative refractive index between the active material and the substrates (namely, the first substrate and the second substrate) in the at least one of the plurality of segments of the active optical element. In order to produce the given optical power at the at least one of the plurality of segments, the active material in the at least one of the plurality of segments is controlled by generating a potential difference between the at least one first electrode and the at least one of the plurality of second electrodes. The at least one of the plurality of segments is considered to be in an 'ON' mode in which the given optical power is produced thereat, when a given potential difference is generated between the at least one first electrode and the at least one of the plurality of second electrodes, depending on the at least one given voltage at which the entirety of the at least one first electrode is driven, whilst the at least one of the plurality of second electrodes is selectively connected to the electrical ground without any additional impedance. The remainder of the plurality of segments are considered to be in an 'OFF' mode in which the remainder of the plurality of segments has a base optical power (which may be a negative optical power or a zero optical power depending on the user's need), when (almost) zero potential difference is generated between the at least one first electrode and the remainder of the plurality of second electrodes (namely, by driving the entirety of the at least one first electrode at the at least one given voltage and applying (and modulating) the additional impedance between the electrical ground and the remainder of the plurality of second electrodes).

According to an embodiment, the at least one given voltage comprises a plurality of given voltages, and the at least one first electrode comprises a plurality of first electrodes that are aligned with respective ones of the plurality of second electrodes. In this regard, two or more of the plurality of first electrodes are driven at respective ones of the plurality of given voltages, to allow different amounts of the potential difference to be generated between the two or more of the plurality of first electrodes and respective ones of the plurality of second electrodes. In such a case, the at least one of the plurality of segments comprise two or more neighbouring segments in which the given optical power is varied in a gradient manner across the two or more neighbouring segments, thereby providing a smooth transition in the optical power between the two or more neighbouring segments. This allows the optical power to be produced in a spatially-variable manner, and is highly desirable for adaptive optical apparatuses that are susceptible to be employed for generating different optical powers in different segments of the active optical element.

It will be appreciated that such a smooth transition in the optical power can be achieved in various ways. One way to achieve smooth transition in the optical power is to implement the at least one first electrode as the plurality of first electrodes, and to drive two or more of the plurality of first electrodes at respective ones of the plurality of given voltages, as described above. Another way to achieve smooth transition in the optical power is to modulate the additional impedance applied to two or more second electrodes from amongst the remainder of the plurality of second electrodes, thereby generating different amounts of the potential difference between the at least one first electrode and the two or more second electrodes, as described earlier. Yet another way to achieve smooth transition in the optical power is to combine both the aforementioned ways.

For illustration purposes only, there will now be described different implementations of the active optical element. In these different implementations, the active material is a liquid crystal material, wherein when controlling the active material, an alignment of liquid crystal molecules in the liquid crystal material is controlled to adjust a refractive index of the liquid crystal material, thereby producing the given optical power. The alignment of the liquid crystal molecules in the at least one of the plurality of segments of the active optical element changes with a change in the potential difference generated between the at least one first electrode and the at least one of the plurality of second electrodes.

Optionally, the active optical element comprises a first dielectric layer disposed between the first substrate and the at least one first electrode, and a second dielectric layer disposed between the second substrate and the plurality of second electrodes. The first dielectric layer and the second dielectric layer may, for example, be made of silicon oxide ($SiO_x$).

Moreover, optionally, the active optical element further comprises a sealing contour of a polymer material that seals the liquid crystal material between the first substrate and the second substrate. The sealing contour not only keeps the liquid crystal material inside, but also protects the liquid crystal material from air (mainly, oxygen) and dust (ambient atmosphere), and thus, ensures a reliable operation of the active optical element.

The different implementations include a first implementation that works on the principle of refractive index matching, and a second implementation that works on the principle of liquid crystal Fresnel lenses.

Some examples of the first implementation have been illustrated in conjunction with FIGS. 1A-1C. In the first implementation, at least one of the first substrate, the second substrate is implemented as a Fresnel lens having concentric grooves, wherein the concentric grooves face the liquid crystal material encased between the first substrate and the second substrate. The at least one of the first substrate, the second substrate that is implemented as a Fresnel lens is hereinafter referred to as the "Fresnel substrate", for the sake of convenience only. The shape of the concentric grooves can be refractive or diffractive.

In the first implementation, the concentric grooves of the Fresnel substrate can be formed to emulate characteristics of a planoconvex lens whose curvature corresponds to the given optical power that is to be produced, namely the positive optical power that is prescribed to the user for presbyopia. When the refractive index of the liquid crystal material is adjusted to match a refractive index of the Fresnel substrate, an interface between the liquid crystal material and the concentric grooves of the Fresnel substrate disappears. As a result, the active optical element produces the base optical power, which may be a negative optical power or a zero optical power depending on the user's need. When the refractive index of the liquid crystal material in the at least one of the plurality of segments of the active optical element is adjusted to be different from (optionally, to be lower than) the refractive index of the Fresnel substrate, the given optical power is produced at the at least one of the plurality of segments, while the remainder of the plurality of segments has the base optical power. It will be appreciated that an intermediate part of the active optical element at a boundary of the at least one of the plurality of segments and the remainder of the plurality of segments can have an optical power that enables smooth transitioning from the given optical power to the base optical power.

The technical benefit of employing the Fresnel substrate in the first implementation is that it allows the active optical element to operate with a thin layer of the liquid crystal material. Thinner the layer of the liquid crystal material, lower is the amount of potential difference that is required to adjust the refractive index of the liquid crystal material. Thus, electrical power requirements of the active optical element are reduced greatly.

In the second implementation, the active optical element is implemented as a liquid crystal Fresnel lens. In such an implementation, the at least one first electrode comprises a plurality of concentric ring electrodes. One example of the second implementation has been illustrated in conjunction with FIGS. 2B-2E.

The liquid crystal Fresnel lens has concentric zones that are formed between adjacent concentric ring electrodes. These concentric zones are formed entirely by adjusting the refractive index of the liquid crystal material in said concentric zones by applying different voltages in corresponding concentric ring electrodes. In other words, these concentric zones are not physical grooves, and are formed by applying the different voltages to the liquid crystal material itself. When all of the plurality of second electrodes are connected to the electrical ground without any additional impedance, the given optical power is produced in an entirety of the liquid crystal Fresnel lens. However, when only the at least one of the plurality of second electrodes is selectively connected to the electrical ground without any additional impedance (whilst applying and modulating the additional impedance between the electrical ground and the remainder of the plurality of second electrodes), the given optical power is produced only in the at least one of the plurality of segments.

In this way, various optical powers can be produced in different segments of the active optical element depending on an arrangement, a number, a size and a shape of the plurality of segments, the at least one given voltage at which the at least one first electrode is driven, and the extent of modulation of the additional impedance applied to the remainder of the plurality of second electrodes.

It will be appreciated that the refractive index of the first substrate can be same as or different from the refractive index of the second substrate. Moreover, the first substrate and/or the second substrate can be made of any one of: glass, a polycarbonate, a plastic, a high-index plastic. The base optical power that is to be produced by the active optical element depends on the curvature of surfaces of the first substrate and/or the second substrate. A person skilled in the art will recognize many variations, alternatives, and modifications of embodiments of the present disclosure.

Optionally, in this regard, the optical apparatus further comprises a passive optical element having a fixed optical power, wherein the fixed optical power of the passive optical element is combined with the given optical power to produce a combined optical power. Herein, the combined optical power refers to a sum of the fixed optical power and the given optical power. Optionally, an optical axis of the passive optical element is aligned with the optical axis of the active optical element.

Throughout the present disclosure, the term "passive optical element" refers to an optical element whose optical power cannot be changed. In other words, the optical power of the passive optical element is fixed.

The passive optical element can be employed in the aforementioned first implementation (that is based on the principle of refractive index matching) as well as the aforementioned second implementation (that is based on the principle of liquid crystal Fresnel lens). Optionally, the passive optical element is implemented as any one of: the first substrate, the second substrate.

When the active optical element is switched 'OFF', the active optical element produces no optical power. In such a case, the combined optical power (that is produced by the combination of the fixed optical power and the given optical power) can be employed to produce the base optical power. In some implementations, a surface of one of the first substrate and the second substrate through which light would exit towards the user's eye, during operation of the optical apparatus, could be made planoconcave, such that a curvature of said surface corresponds to the base optical power. As mentioned earlier, the base optical power can be a negative optical power or a zero optical power depending on the user's need. Thus, the passive optical element can be beneficially employed to compensate for the condition of myopia in the user. However, in a case where the user only requires reading power, the passive optical element may have zero optical power. In other implementations, the passive optical element can be implemented as a Fresnel lens having concentric grooves. These concentric grooves can be formed to emulate characteristics of a planoconcave lens whose curvature corresponds to the base optical power. The concentric grooves are beneficially formed on the surface of one of the first substrate and the second substrate through which the light would exit towards the user's eye, during operation of the optical apparatus.

Furthermore, it will be appreciated that the technical benefit of selectively connecting the at least one of the plurality of second electrodes to the electrical ground (without any additional impedance) is that the at least one of the plurality of segments in the active optical element can be modified on the fly. This is particularly beneficial in a case where the at least one of the plurality of segments (at which the given optical power is to be produced) is selected based on the user's gaze.

Optionally, in this regard, the optical apparatus further comprises eye-tracking means. Optionally, the processor is configured to:

process eye-tracking data, collected by the eye-tracking means, to determine a gaze direction of a given eye of a user in front of which the active optical element is being worn; and select the at least one of the plurality of segments of the active optical element in which the active material is to be controlled to produce the given optical power, based on the gaze direction of the given eye of the user.

The technical benefit of such a gaze-based selection is that the optical power can be adjusted at different segments of the active optical element in real time or near real time according to the user's gaze. This enables the user to see objects (whether nearby or faraway) clearly at all times. As an example, the user may be installing a lighting fixture on a ceiling of a room, while her/his tools may be lying on a floor of the room. In such a case, the user may need to look at the lighting fixture and at the tools at different points in time, via a top part and a bottom part of the active optical element, when the optical apparatus is worn by the user. Appropriate optical powers are produced at the top part and the bottom part of the active optical element, when the user needs to focus on the lighting fixture (namely, a nearby object) and the tools (namely, faraway objects).

Throughout the present disclosure, the term "eye-tracking means" refers to specialized equipment that is employed to detect and/or follow a direction of gaze of the user of the optical apparatus. Such eye tracking is performed when the optical apparatus, in operation, is worn by the user. Optionally, the eye-tracking means is implemented by way of contact lenses having sensors, cameras monitoring features of the user's eye, wavefront sensors sensing a wavefront of light signals reflected off a surface of the user's eye, and the like. Such features may comprise at least one of: a shape of a pupil of the user's eye, a size of the pupil, corneal reflections of at least one light source from a surface of the user's eye, a relative position of the pupil with respect to the corneal reflections, a relative position of the pupil with respect to corners of the user's eye. Such eye-tracking means are well-known in the art.

Additionally, optionally, the processor is configured to:

process eye-tracking data, collected by the eye-tracking means, to determine gaze directions of a user's eyes;

determine a given optical depth at which the user is gazing, based on at least one of: the gaze directions of the user's eyes, depth information of a real-world scene currently being seen by the user;

determine an optical power prescribed for a given eye of the user corresponding to the given optical depth at which the user is gazing, the active optical element being worn in front of the given eye of the user; and determine the given optical power to be produced, based on the optical power prescribed for the given eye of the user.

Optionally, the given optical depth at which the user is gazing is determined based on a convergence of the gaze directions of the user's eyes. In this regard, the given optical depth can be determined, based on an inter-pupillary distance of the user, by using triangulation. Additionally or alternatively, the given optical depth can be determined based on the depth information and the given gaze direction of the given eye of the user. In this regard, the depth information can be collected using at least one of: a depth camera, a time-of-flight (ToF) camera, an ultrasound imaging sensor, a radar, a light detection and ranging (Lidar) sensor.

The user may have both presbyopia and myopia, or may have presbyopia only. In any case, different optical powers can be prescribed for the given eye of the user corresponding to different optical depths. When determining the optical power corresponding to the given optical depth, the optical power is selected, from amongst the different optical powers prescribed for the different optical depths, based on the given optical depth.

As described earlier, the given optical power to be produced depends on how the optical apparatus has been implemented. In implementations where the optical apparatus comprises the passive optical element in addition to the active optical element, the optical power prescribed for the given eye of the user is produced by the combined optical power (namely, the sum of the fixed optical power and the given optical power). Therefore, the given optical power to be produced at the at least one of the plurality of segments of the active optical element is determined based on the optical power prescribed for the given eye of the user and the fixed optical power of the passive optical element. On the other hand, in implementations where the optical apparatus does not comprise any passive optical element, the given optical power to be produced at the at least one of the plurality of segments of the active optical element is same as the optical power prescribed for the given eye of the user.

DETAILED DESCRIPTION OF THE DRAWINGS

Referring next to FIGS. 1A-1C, illustrated are cross-sectional views of an optical apparatus 100, in accordance with various embodiments of the present disclosure. The optical apparatus 100 comprises an active optical element that comprises an active material 101 encased between a first substrate 102 and a second substrate 103. The active optical element optionally comprises a sealing contour 104. At least one first electrode 105 is disposed between the active material 101 and the first substrate 102, and a plurality of second electrodes 106 are disposed between the active material 101 and the second substrate 103. As shown in FIG. 1A, the first substrate 102 could be implemented as a planoconvex lens whose convex surface faces the active material 101, and whose curvature corresponds to a given optical power that is to be produced, namely a positive optical power that is prescribed to the user for presbyopia. Alternatively, as shown in FIGS. 1B-1C, the first substrate 102 could be implemented as a Fresnel lens having concentric grooves, wherein the concentric grooves face the active material 101. In such a case, the concentric grooves of the Fresnel substrate are formed to emulate characteristics of the aforesaid planoconvex lens. Optionally, the optical apparatus 100 further comprises a passive optical element having a fixed optical power. The passive optical element can be implemented as any one of: the first substrate 102, the second substrate 103. With reference to FIG. 1C, the second substrate 103 functions as a passive optical element, and is implemented as a planoconcave lens whose curvature corresponds to a base optical power, which is a negative optical power.

In a first implementation that works on the principle of refractive index matching and where the active material 101 is a liquid crystal material, a refractive index of the liquid crystal material can be adjusted to produce the given optical power at a given part (namely, at least one of a plurality of segments) of the active optical element. When the refractive index of the liquid crystal material matches a refractive index of the first substrate 102, an interface between the active material 101 and the first substrate 102 disappears. As a result, the optical apparatus 100 produces the base optical power.

FIGS. 1A-1C are merely examples, which should not unduly limit the scope of the claims herein. It is to be understood that the specific implementations of the optical apparatus 100 are provided as examples and are not to be construed as limiting it to specific arrangements of the first substrate, the second substrate, the at least one first electrode and the plurality of second electrodes, or to specific curvatures of the first substrate and the second substrate. A person skilled in the art will recognize many variations, alternatives, and modifications of embodiments of the present disclosure.

Figure 2B:
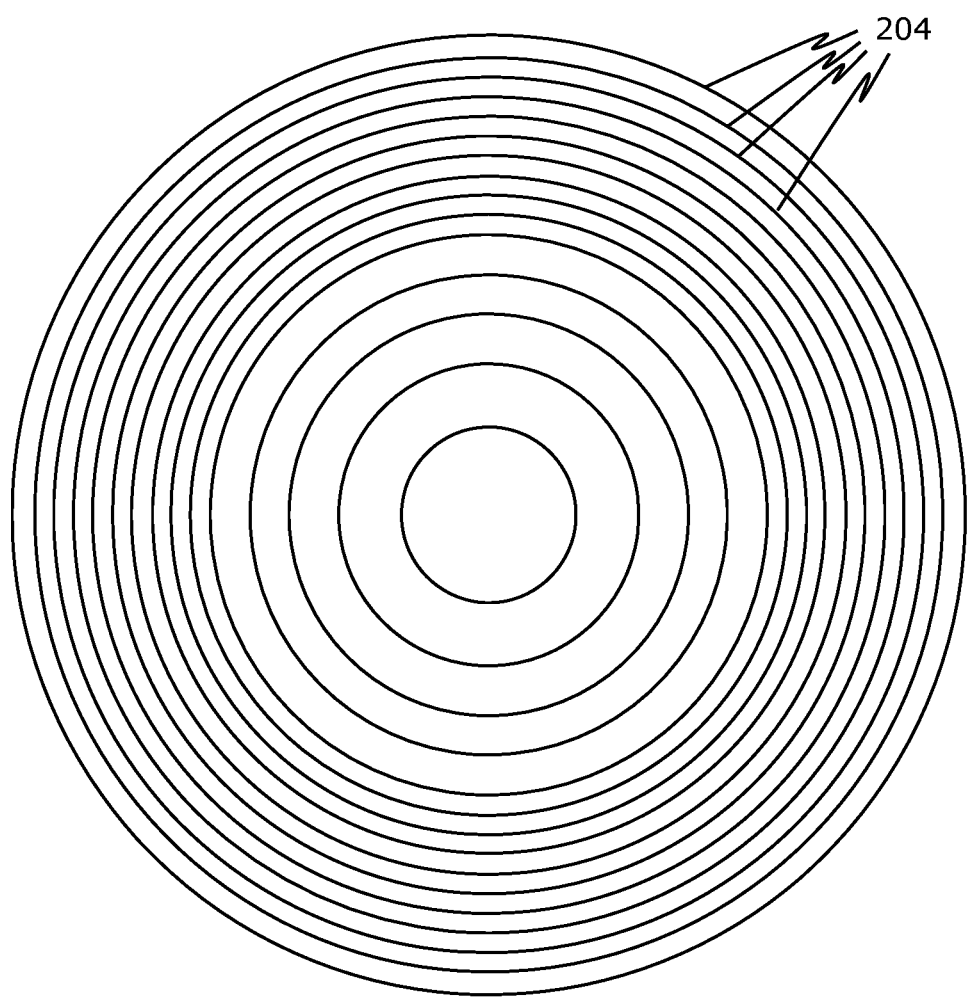
FIG. 2B depicts an example implementation of at least one first electrode of the active optical element, in accordance with an embodiment of the present disclosure.
Figure 2C:
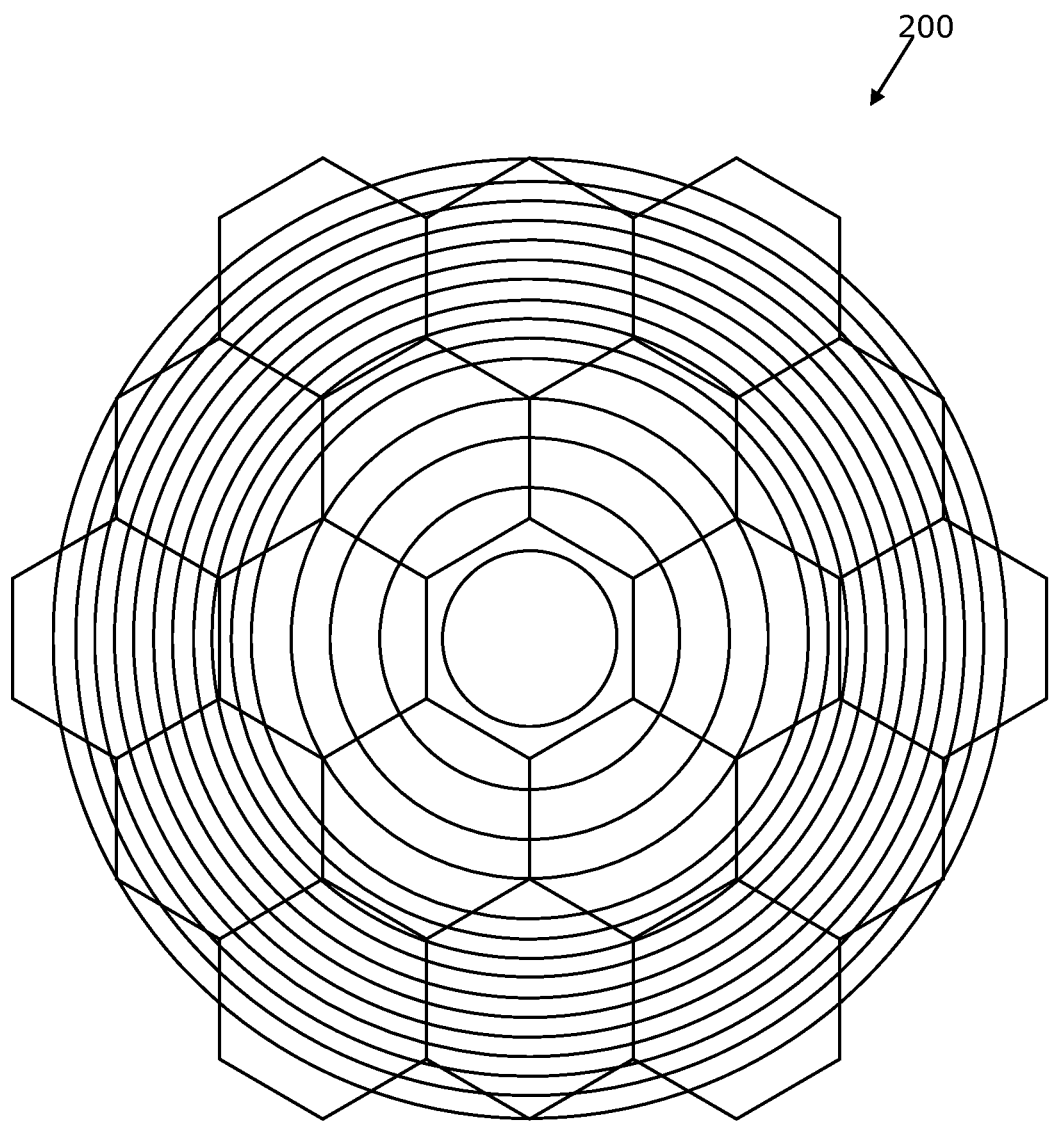
FIG. 2C depicts an implementation of the active optical element as a liquid crystal Fresnel lens, in accordance with an embodiment of the present disclosure.

Referring next to FIGS. 2A-2E, FIG. 2A depicts an example implementation of a plurality of segments 202 of an active optical element 200, in accordance with an embodiment of the present disclosure. The plurality of segments 202 have a polygonal shape, wherein the plurality of segments 202 fit together in a tiled manner. With reference to FIG. 2A, the plurality of segments 202 are hexagonal. In such an implementation, a plurality of second electrodes are implemented as a plurality of isolated tiles of a conductive material. FIG. 2B depicts an example implementation of at least one first electrode 204 of the active optical element 200, in accordance with an embodiment of the present disclosure. The at least one first electrode 204 is implemented as a plurality of concentric ring electrodes. With reference to FIG. 2C, the plurality of segments 202 and the plurality of concentric ring electrodes can be employed together to implement the active optical element 200 as a liquid crystal Fresnel lens, in accordance with an embodiment of the present disclosure. The liquid crystal Fresnel lens has concentric zones that are formed between adjacent concentric ring electrodes. These concentric zones are formed entirely by adjusting the refractive index of the liquid crystal material in said concentric zones by applying different given voltages in corresponding concentric ring electrodes. In other words, these concentric zones are not physical grooves, and are formed by applying the different given voltages to the liquid crystal material itself.

Figure 2D:
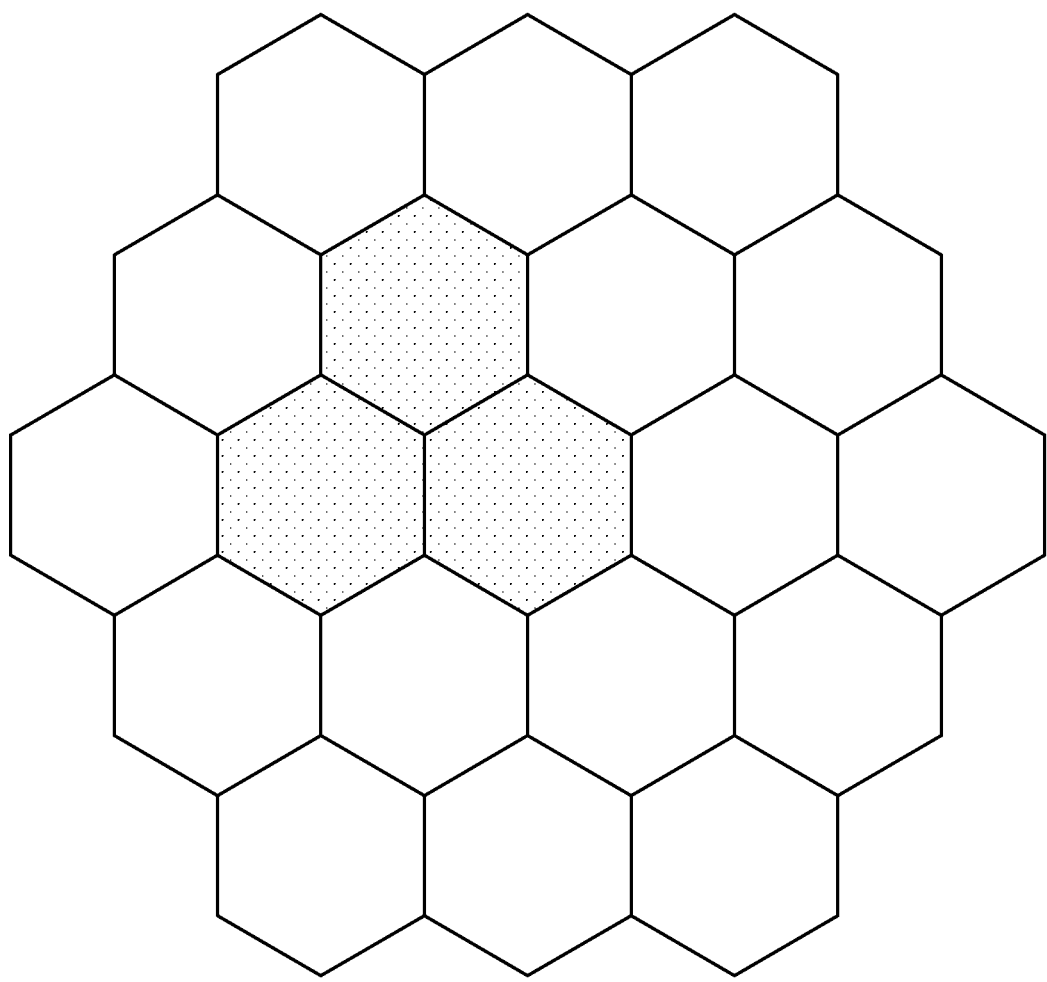
FIG. 2D depicts a scenario where at least one of a plurality of second electrodes is selectively connected to an electrical ground without any additional impedance, whilst applying and modulating an additional impedance between the electrical ground and a remainder of the plurality of second electrodes, in accordance with an embodiment of the present disclosure.

FIG. 2D depicts a scenario where the plurality of concentric ring electrodes are driven at respective ones of the different given voltages, and at least one of the plurality of second electrodes is selectively connected to an electrical ground without any additional impedance (whilst applying and modulating an additional impedance between the electrical ground and a remainder of the plurality of second electrodes). As a result, a given optical power is produced in at least one of the plurality of segments 202 (shown as three hexagonal tiles with a dotted pattern). In the illustrated example, there are 19 segments in the active optical element 200, wherein second electrodes corresponding to only 3 out of 19 segments are selectively connected to the electrical ground without any additional impedance. As a result, there is a power saving of approximately 85 percent.

Figure 2E:
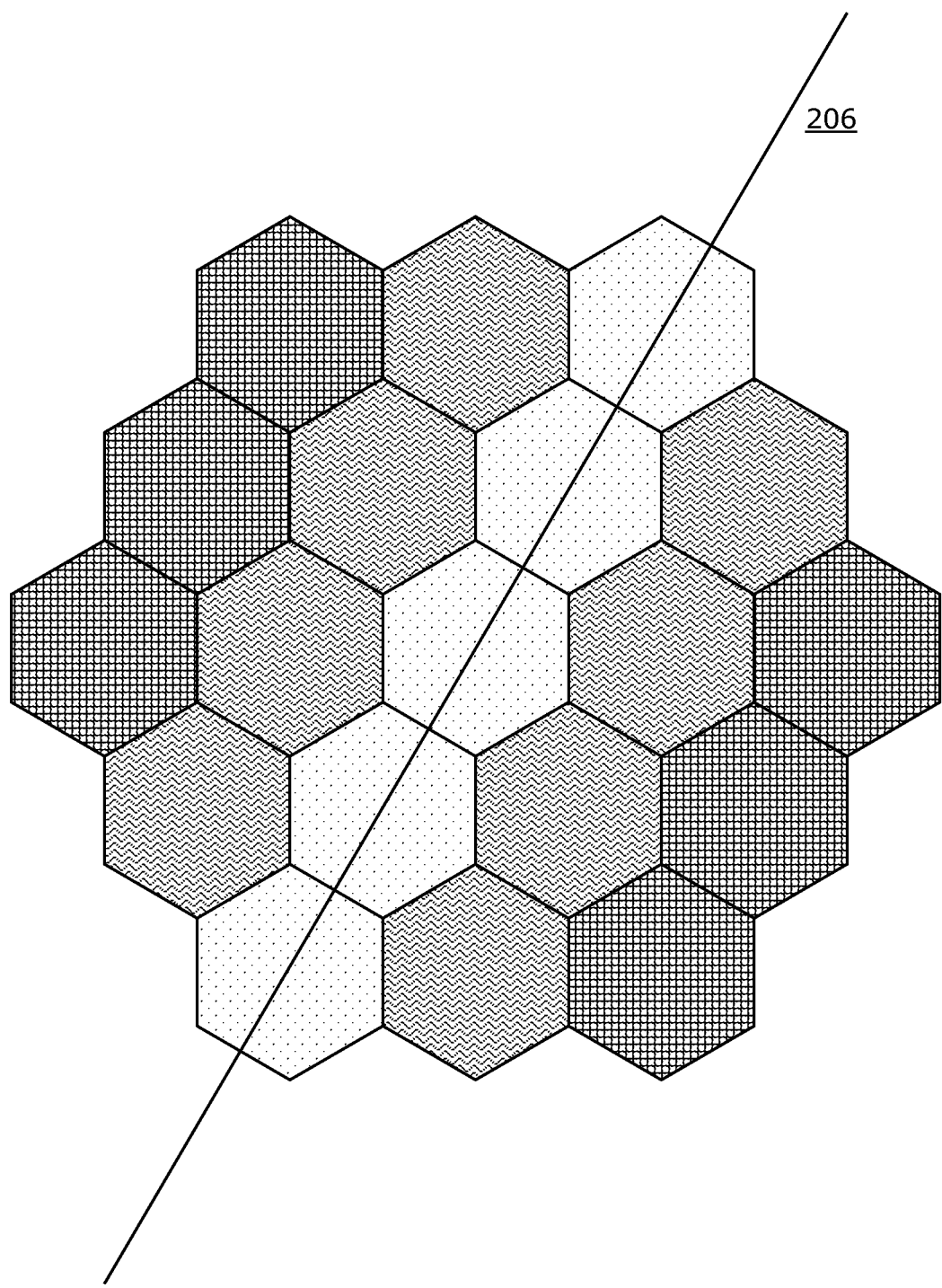
FIG. 2E depicts another scenario where the active optical element can be utilised for correcting astigmatism, in accordance with an embodiment of the present disclosure.

FIG. 2E depicts another scenario where the plurality of concentric ring electrodes are driven at respective ones of the different given voltages, and a first set of five second electrodes (shown with dotted pattern) is selectively connected to the electrical ground without any additional impedance, whilst applying and modulating an additional impedance between the electrical ground and two second sets of four second electrodes each (shown with a zigzag pattern) and between the electrical ground and two third sets of three second electrodes each (shown with a grid pattern). The additional impedance applied between the electrical ground and the two third sets of three second electrodes each is larger than the additional impedance applied between the electrical ground and the two second sets of four second electrodes each. The first set of five second electrodes are aligned along a cylindrical axis 206. As shown in FIG. 2E, the second electrodes in the two second sets and the two third sets are also arranged parallel to the cylindrical axis 206. This enables the active optical element 200 to function as a spherocylindrical lens for correcting astigmatism.

Figure 3:
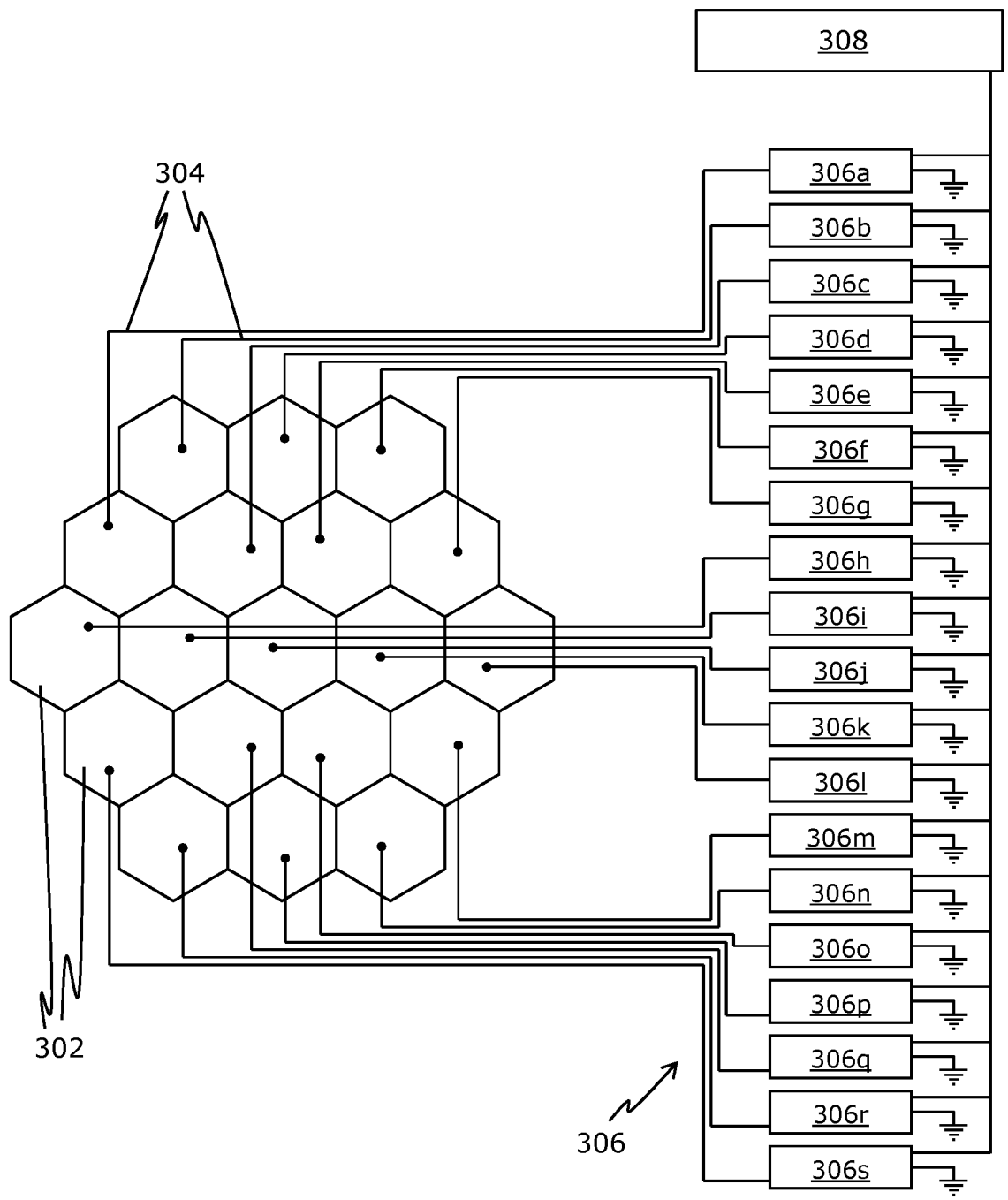
FIG. 3 is a schematic circuit diagram of an active optical element, in accordance with an embodiment of the present disclosure.

FIG. 3 is a schematic circuit diagram of an active optical element, in accordance with an embodiment of the present disclosure. In the active optical element, a plurality of second electrodes 302 are coupled, via feed lines 304, to means 306 for applying and modulating an additional impedance between an electrical ground and the plurality of second electrodes 302. Said means 306 comprises a matrix of electrical components (depicted as 306a-s), which comprise at least one of: TFT switches, MOSFET switches, programmable resistors, programmable inductors, programmable capacitors. A processor 308 controls an operation of the means 306. During operation of the active optical element, said means 306 drives the plurality of second electrodes 302 using a drive signal, and connects at least one of the plurality of second electrodes 302 to the electrical ground without any additional impedance, whilst applying and modulating the additional impedance between the electrical ground and a remainder of the plurality of second electrodes 302.

Figure 4A:
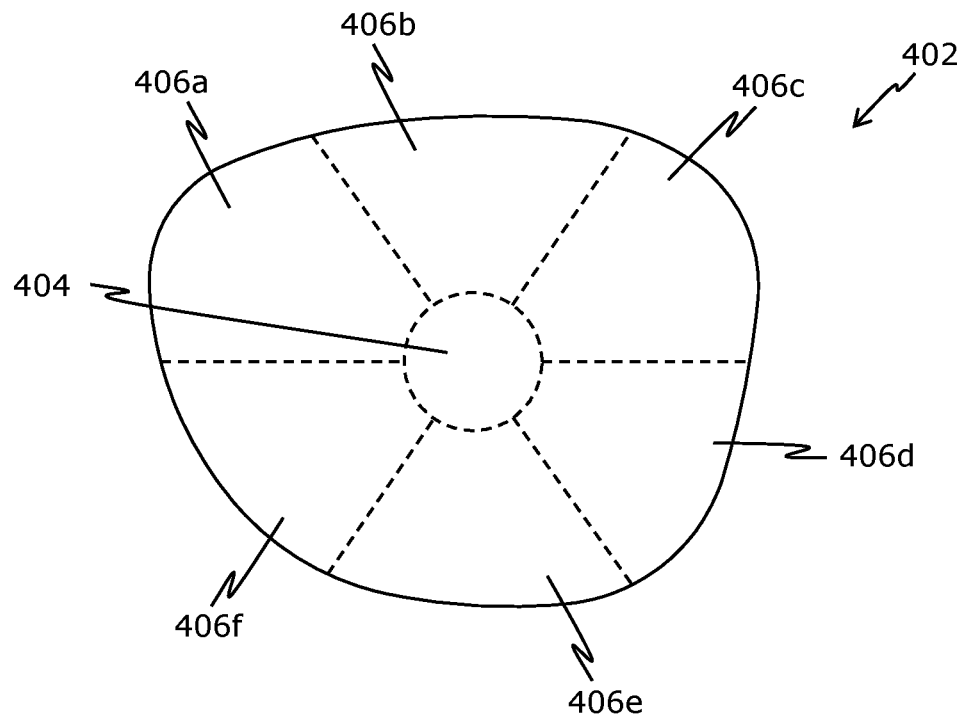
FIGS. 4A-4B depict an active optical element, in accordance with an embodiment of the present disclosure.
Figure 4B:
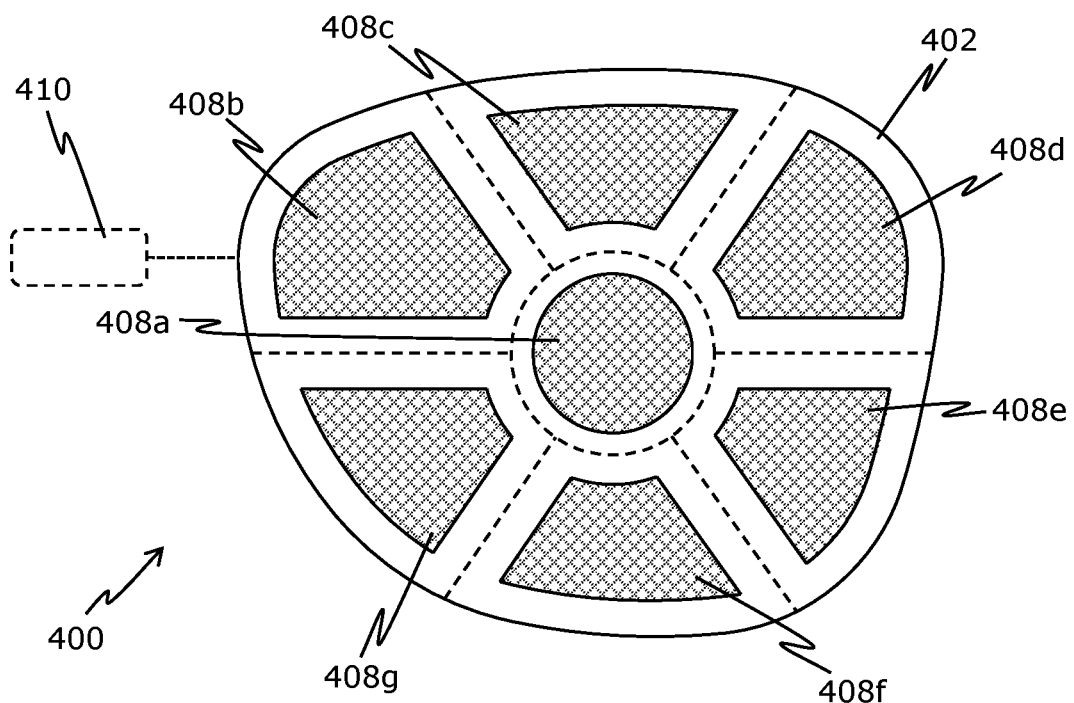

Referring next to FIGS. 4A-4B, illustrated is an active optical element 402, in accordance with an embodiment of the present disclosure. A plurality of segments of the active optical element 402 comprise a central portion 404 and a plurality of sectors 406a-f surrounding the central portion 404, wherein the central portion 404 and the plurality of sectors 406a-f are arranged around an optical axis of the active optical element 402. In FIG. 4B, there is shown an optical apparatus 400 comprising the active optical element 402 and a processor 410. A plurality of second electrodes 408a-g deposited on a second substrate of the active optical element 402 are also shown. The second electrode 408*a* corresponds to the central portion 404, while the second electrodes 408*b-g* correspond to respective ones of the plurality of sectors 406*a-f*. At least one first electrode deposited on a first substrate of the active optical element 402 may be implemented as a single electrode layer or as a plurality of first electrodes that are aligned with respective ones of the plurality of second electrodes 408*a-g*.

FIGS. 2A-2E, 3 and 4A-4B are merely examples, which should not unduly limit the scope of the claims herein. It is to be understood that the specific implementations of the active optical element is provided as an example and is not to be construed as limiting it to specific numbers, sizes, shapes or arrangements of segments and electrodes. A person skilled in the art will recognize many variations, alternatives, and modifications of embodiments of the present disclosure. It will be appreciated that a total number, a size, a shape and an arrangements of the segments and electrodes depend on optical properties required for specific user applications as well as manufacturing methods employed for manufacturing such active optical elements.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

What is claimed is:

1. An active optical element comprising:
    at least a first substrate and a second substrate, the first substrate and the second substrate being optically transparent;
    an active material encased between the first substrate and the second substrate;
    at least one first electrode deposited on the first substrate and disposed between the first substrate and the active material, the at least one first electrode being optically transparent;
    a plurality of second electrodes deposited on the second substrate and disposed between the second substrate and the active material, the plurality of second electrodes being optically transparent, wherein the plurality of second electrodes are to be employed as a ground plane of the active optical element, the plurality of second electrodes dividing the active optical element into a plurality of segments; and
    means for applying and modulating an additional impedance between an electrical ground and the plurality of second electrodes, wherein the plurality of second electrodes are connected to the electrical ground via said means,
    wherein:
        an entirety of the at least one first electrode is driven at: at least one given voltage that corresponds to a given optical power to be produced in at least one of the plurality of segments of the active optical element, said means is driven to selectively connect at least one of the plurality of second electrodes corresponding to the at least one of the plurality of segments in which the given optical power is to be produced to the electrical ground without any additional impedance, while applying and modulating the additional impedance between the electrical ground and a remainder of the plurality of second electrodes,
        the active material in the at least one of the plurality of segments is controlled by a potential difference generated between the at least one given voltage and the electrical ground to produce the given optical power.

2. The active optical element of claim 1, further comprising a processor configured to:
    select the at least one given voltage based on the given optical power to be produced in the at least one of the plurality of segments of the active optical element; and
    generate a drive signal to drive the entirety of the at least one first electrode at the at least one given voltage.

3. The active optical element of claim 1, further comprising a processor configured to generate a drive signal to drive said means to selectively connect the at least one of the plurality of second electrodes to the electrical ground without any additional impedance, whilst applying and modulating the additional impedance between the electrical ground and the remainder of the plurality of second electrodes.

4. The active optical element of claim 1, wherein said means comprises a matrix of thin-film transistor (TFT) switches that are coupled to respective ones of the plurality of second electrodes.

5. The active optical element of claim 1, wherein said means comprises a matrix of metal-oxide-semiconductor field-effect transistor (MOSFET) switches that are coupled to respective ones of the plurality of second electrodes, wherein the MOSFET switches operate as electrically controllable resistors in a triode region.

6. The active optical element of claim 1, wherein said means comprises a matrix of programmable resistors that are coupled to respective ones of the plurality of second electrodes.

7. The active optical element of claim 1, wherein said means comprises a matrix of programmable inductors that are coupled to respective ones of the plurality of second electrodes.

8. The active optical element of claim 1, wherein said means comprises a matrix of programmable capacitors that are coupled to respective ones of the plurality of second electrodes.

9. The active optical element of claim 1, wherein the plurality of segments have a polygonal shape, and wherein the plurality of segments fit together in a tiled manner.

10. The active optical element of claim 1, wherein the plurality of segments comprise a central portion and a plurality of sectors surrounding the central portion, wherein the central portion and the plurality of sectors are arranged around an optical axis of the active optical element.

11. The active optical element of claim 1, wherein the plurality of second electrodes are implemented as a single weakly conductive plane with a plurality of highly conductive electrodes.

12. The active optical element of claim 1, wherein the plurality of second electrodes are implemented as a plurality of isolated tiles of a conductive material.

13. The active optical element of claim 1, wherein the active material is a liquid crystal material.

14. The active optical element of claim 1, wherein the active optical element is implemented as a liquid crystal Fresnel lens, and wherein the at least one first electrode comprises a plurality of concentric ring electrodes.

15. The active optical element of claim 1, wherein the at least one of the plurality of second electrodes comprises a first set of second electrodes that are aligned along a cylindrical axis, while the remainder of the plurality of second electrodes comprises:
  two second sets of second electrodes adjacent to the first set of second electrodes, and
  two third sets of second electrodes adjacent to respective ones of the two second sets of second electrodes,
  wherein the second electrodes in the two second sets and the two third sets are arranged parallel to the cylindrical axis, and wherein an additional impedance applied between the electrical ground and the two third sets of second electrodes is larger than an additional impedance applied between the electrical ground and the two second sets of second electrodes.

16. An optical apparatus comprising an active optical element of claim 1.

17. The optical apparatus of claim 16, further comprising a passive optical element having a fixed optical power, wherein the fixed optical power of the passive optical element is combined with the given optical power to produce a combined optical power.

18. The optical apparatus of claim 16, wherein the passive optical element is implemented as any one of: the first substrate, the second sub state.

19. The optical apparatus of claim 16, wherein the passive optical element is implemented as a Fresnel lens having concentric grooves.

20. The optical apparatus of claim 16, further comprising eye-tracking means and a processor configured to:
  process eye-tracking data, collected by the eye-tracking means, to determine a gaze direction of a given eye of a user in front of which the active optical element is being worn; and
  select the at least one of the plurality of segments of the active optical element in which the active material is to be controlled to produce the given optical power, based on the gaze direction of the given eye of the user.

21. The optical apparatus of claim 16, further comprising eye-tracking means and a processor configured to:
  process eye-tracking data, collected by the eye-tracking means, to determine gaze directions of a user's eyes;
  determine a given optical depth at which the user is gazing, based on at least one of: the gaze directions of the user's eyes, depth information of a real-world scene currently being seen by the user;
  determine an optical power prescribed for a given eye of the user corresponding to the given optical depth at which the user is gazing, the active optical element being worn in front of the given eye of the user; and
  determine the given optical power to be produced, based on the optical power prescribed for the given eye of the user.

\* \* \* \* \*